(12) United States Patent
Gould et al.

(10) Patent No.: US 7,221,286 B2
(45) Date of Patent: May 22, 2007

(54) INDUCTIVE COMMUNICATIONS PORT FOR AN AUTOMATIC METER READING COMMUNICATION DEVICE

(75) Inventors: Mark A. Gould, North Huntington, PA (US); Rex A. Johnson, Uniontown, PA (US); Terry L. Van Olst, Coal Center, PA (US)

(73) Assignee: M&FC Holding, LLC, Wilmington, DE (US)

( * ) Notice: Subject to any disclaimer, the term of this patent is extended or adjusted under 35 U.S.C. 154(b) by 224 days.

(21) Appl. No.: 11/102,274

(22) Filed: Apr. 8, 2005

(65) Prior Publication Data

US 2006/0227006 A1 Oct. 12, 2006

(51) Int. Cl.
*G08B 23/00* (2006.01)

(52) U.S. Cl. .................... 340/870.02; 343/719
(58) Field of Classification Search ........... 340/870.02, 340/870.03; 705/412; 343/719; 324/76, 324/75
See application file for complete search history.

(56) References Cited

U.S. PATENT DOCUMENTS 4,463,354 A * 7/1984 Sears .................... 340/870.02
5,416,475 A * 5/1995 Tolbert et al. ......... 340/870.02
5,619,192 A * 4/1997 Ayala .................... 340/870.02
5,659,300 A * 8/1997 Dresselhuys et al. .. 340/870.02
6,181,257 B1 * 1/2001 Meek et al. ........... 340/870.01
6,369,769 B1 * 4/2002 Nap et al. .................... 343/719
6,657,552 B2 * 12/2003 Belski et al. .......... 340/870.02
2006/0218104 A1 * 9/2006 Johnson et al. .............. 705/412

FOREIGN PATENT DOCUMENTS

EP 0252184 * 1/1988
GB 2268032 * 12/1993

* cited by examiner

*Primary Examiner*—Albert K. Wong
(74) *Attorney, Agent, or Firm*—Andrus, Sceales, Starke & Sawall, LLP (57) ABSTRACT

A system for providing the ability to obtain consumption data from a communication device used to transmit accumulated data from the meter register. The system includes a programming port formed as part of the communication device. The programming port includes the programming coil that allows the accumulation data received from the meter register to be read by an interrogation device. Further, the programming coil allows programming information to be transferred to the communication device from the interrogation device. The system can also include a reading module coupled to the programming port of the communication device through an inductive coupling. The reading module can extend through a pit lid such that the reading module can be accessed without removing the pit lid.

15 Claims, 5 Drawing Sheets

INDUCTIVE COMMUNICATIONS PORT FOR AN AUTOMATIC METER READING COMMUNICATION DEVICE

BACKGROUND OF THE INVENTION

The present invention generally relates to the automatic reading of utility meters. More specifically, the present invention relates to a system and apparatus that allows an electronic meter register that is connected to an automatic meter reading (AMR) communication device to be read locally without requiring any additional conductive connections.

A long standing problem in the utility industry is the economic reading of the utility meters without inconvenience to the homeowner. The problem is especially acute in connection with the reading of water meters. In geographic areas that are subject to freezing temperatures, it has in the past been necessary to install the meters within the residence to prevent damage to meter when the temperature drops such that the water within the meter freezes. However, the reading of such meter installations presents a number of problems, such as the inconvenience to the homeowner as well as the inconvenience to the meter reader when the homeowner is not present at the time of the individual meter reading.

In addition, manual meter reading has a significant disadvantage in that it requires a large amount of manpower, leading to significant expense. Further, meter readers may erroneously record the numeral values of the meter register or the homeowner may not be present at the time the meter reading is to take place.

One solution to these problems in the past was to provide a remote register that is located outside of the residence, preferably on the exterior walls of the residence. The register is typically electrically connected to the device on the meter within the residence that provides pulses or other electrical signal representative of the volumetric flow of the water through the meter. Although this system addresses the problem of inconvenience to the homeowner, the solution still requires the manual reading of the meter on a periodic basis.

In order to solve the personnel requirements of physical meter reading, a large number of remote meter reading units have been developed. These meter reading units may be, for example, an automatic meter reading (AMR) unit. The meter register comprises a sensor to detect the rotational movement of components within the meter to generate an electronic count of the volume of commodity that flows through the meter. The recorded data from the meter is broadcast by a communication device of the AMR unit using an RF signal. In such types of systems, the meter measurement is broadcast from the communication device using an RF signal that can be read from a remote location. In these remote meter reading systems, the antenna of the communication device typically extends slightly above a pit lid such that the radio frequency signals generated by the antenna can be transmitted away from the meter pit. In many situations, the pit lid is formed from a metallic material, such as iron, that significantly inhibits the transmission of radio frequency signals therethrough.

In current AMR applications being developed, a radio transmission circuit including an antenna is used to transmit meter-related information over a relatively long distance, such as up to one-half mile. The use of an AMR radio to transmit meter-related information over a relatively long distance allows the meter data to be read from a remote location and eliminates the requirement of a meter reader physically interrogating the meter from a location proximate to the meter. Such an AMR system is able to transmit meter-related information from the meter to a remote location, such as a gateway node, located within the neighborhood of the meter to be read. This type of remote meter reading dramatically reduces the amount of manpower required to obtain meter readings.

Although AMR applications that utilize a radio signal communication device are useful in reducing the personnel required to obtain meter readings, many utilities express a desire for the ability to make manual, localized meter readings in addition to the readings transmitted by the communication device. Such manual readings are typically done utilizing a meter reading system, such as the TouchRead® system, including a hand-held meter reading device, such as the AutoGun™ hand-held device, both available from Sensus Metering. The TouchRead® system allows service personnel to place the hand-held interrogating device near an external reading module that typically extends through a pit lid or is accessible along the exterior of a consumer's home. The hand-held interrogating device is inductively coupled to the reading module such that information from the meter register connected to the reading module can be read by the hand-held device.

In a typical installation of an AMR communication device that also includes a manual reading module, the reading module is connected to the communication device using a wired-based conductive connection. The conductive connection between the communication device and the reading module typically requires a gel-cap splicing kit that ensures a weather tight and secure electrical connection between the wires from the communication device and the reading module. Although the gel-cap electrical connection between the communication device and the reading module functions adequately once installed, the electrical connection requires service personnel to take additional steps when installing a meter or when retrofitting an existing meter register with the AMR communication device.

Therefore, a need exists for improved method and system of providing a communication connection between the communication device and a reading module such that the reading module can be coupled to the communication device without the requirement of a conductive connection. Further, a need exists for a dependable and secure connection that allows a programming port on the communication device to be accessed from the exterior of the enclosed pit.

SUMMARY OF THE INVENTION

The present invention relates to a unique coupling arrangement between a communication device used to wirelessly transmit accumulated data from a utility meter and a separate, spaced reading module such that the accumulated data from the utility meter can be obtained locally by an interrogating device from the reading module. The signal coupling between the communication device and the reading module is completed without any conductive connections and utilizes an inductive coupling between a pair of inductive coils.

The communication device is positioned at a location remote from the electronic meter register. Typically, the communication device of the present invention is suspended beneath the pit lid that covers a pit enclosing the utility meter including the electronic meter register. The communication device includes electronic circuitry, an internal power supply and an antenna within an environmentally protected inner enclosure. The sealed enclosure of the communication device encloses a programming coil that is positioned behind a programming port formed as a portion of the communication device. The programming coil positioned behind the outer wall of the inner enclosure is electrically coupled to the electronic circuitry of the communication device. The programming coil is used to transfer data and programming commands to and from the electronic circuitry contained within the communication device, such as for modifying the operating program of the electronic circuitry or to extract stored information, such as the accumulated data from the utility meter. The programming coil can be accessed directly by a hand-held interrogating device such that the meter data and programming instructions can be transferred to and from the communication device.

The system of the present invention can include a reading module that is positioned remotely from the communication device and is coupled to the communication device to selectively receive the accumulated meter data. The reading module allows the accumulated data to be read by an interrogating device at a location remote from the communication device. In the preferred implementation of the invention, the reading module is also mounted through the pit lid and includes an upper contact surface that can be accessed by the interrogating device without removing the pit lid.

The reading module includes a reading coil that is positioned slightly below the upper contact surface. The reading coil is coupled to a first end of a communication wire. The second end of the communication wire includes a connector module configured for attachment to the communication device. Specifically, the connector module is configured such that the connector module can be received within a programming port of the communication device. Preferably, the connector module is snap fit into the programming port to provide a secure physical connection between the connector module on the second end of the communication wire and the programming port formed on the communication device.

The connector module surrounds and encapsulates a transfer coil physically connected to the communication wire. When the connector module of the communication wire is received within the programming port on the communication device, the transfer coil within the connector module is physically spaced from the programming coil within the communication device by an air gap. The physical spacing between the transfer coil of the communication wire and the programming coil of the communication device is small enough to permit an inductive coupling between the programming coil and the transfer coil. The inductive coupling between the programming coil and the transfer coil allows signals to be transferred between the two coils. In this manner, programming information from the transfer coil can be received at the programming coil of the communication device and the accumulated data from the communication device can be transferred from the programming coil to the transfer coil using inductive coupling.

The sealed inner enclosure of the communication device is surrounded by an outer mounting shell that includes multiple attachment openings, each of which can receive a receptacle port. Preferably, each of the attachment openings is aligned with a receptacle coil included within the inner enclosure of the communication device.

The receptacle ports can be selectively positioned on the outer shell of the communication device depending upon the number of electronic meter registers utilized with the single communication device. In each case, the receptacle port is generally aligned with an inductive receptacle coil contained within the sealed inner enclosure. The receptacle ports each include an inner cylindrical cavity and a pair of flexible fingers used to secure an attachment module within the receptacle port.

The electronic meter register includes a data transfer wire that is coupled to the electric meter register at a first end. The second end of the data transfer wire can include an attachment module having an outer enclosure surrounding an inductive coil. The attachment module preferably has a cylindrical outer wall and includes a potting material that seals the inductive coil within the attachment module.

When the attachment module is received and retained within the receptacle port, the inductive coil of the attachment module is spaced from a receptacle coil included in the communication device and generally aligned with the receptacle port. However, the proximity between the inductive coil of the data transfer wire and the receptacle coil is sufficient to permit signals present at either coil to be received through an inductive coupling at the other coil. In this manner, the signal connection between the electronic meter register and the communication device can be completed through inductive coupling without the requirement of any conductive connection. In addition to the signal transfer between the inductive coils, power can be transferred from the communication device to the meter register through the inductive coupling. Alternatively, the data transfer wire can be conductively connected to the internal circuitry of the communication device to facilitate communication between the meter register and the communication device.

In addition to allowing the accumulated meter data to be transmitted wirelessly from the communication device, the system of the present invention allows the accumulated meter data to be read by an interrogating device at a location proximate to the communication device. Specifically, when the communication device and the reading module are mounted to a pit lid of a pit enclosure, the reading module allows the accumulated data to be inductively read by the interrogating device without removing the pit lid from the pit enclosure. Further, the reading module can be accessed by the interrogating device such that programming information can be transferred from the interrogating device to the communication device through the communication wire. Again, the transfer of programming information can be completed without removing the pit lid and physically accessing the communication device.

Alternatively, the accumulated meter data can be read by the interrogating device by placing the interrogating device in close proximity to the programming port formed as part of the communication device. In this embodiment, the interrogating device can communicate directly with the communication device through the inductive coupling with the programming coil of the communication device. In this embodiment, programming information and accumulated data can be transferred between the interrogating device and the communication device through an inductive coupling.

BRIEF DESCRIPTION OF THE DRAWINGS

The drawings illustrate the best mode presently contemplated for carrying out the invention. In the drawings.

DETAILED DESCRIPTION OF THE PREFERRED EMBODIMENT

Figure 1:
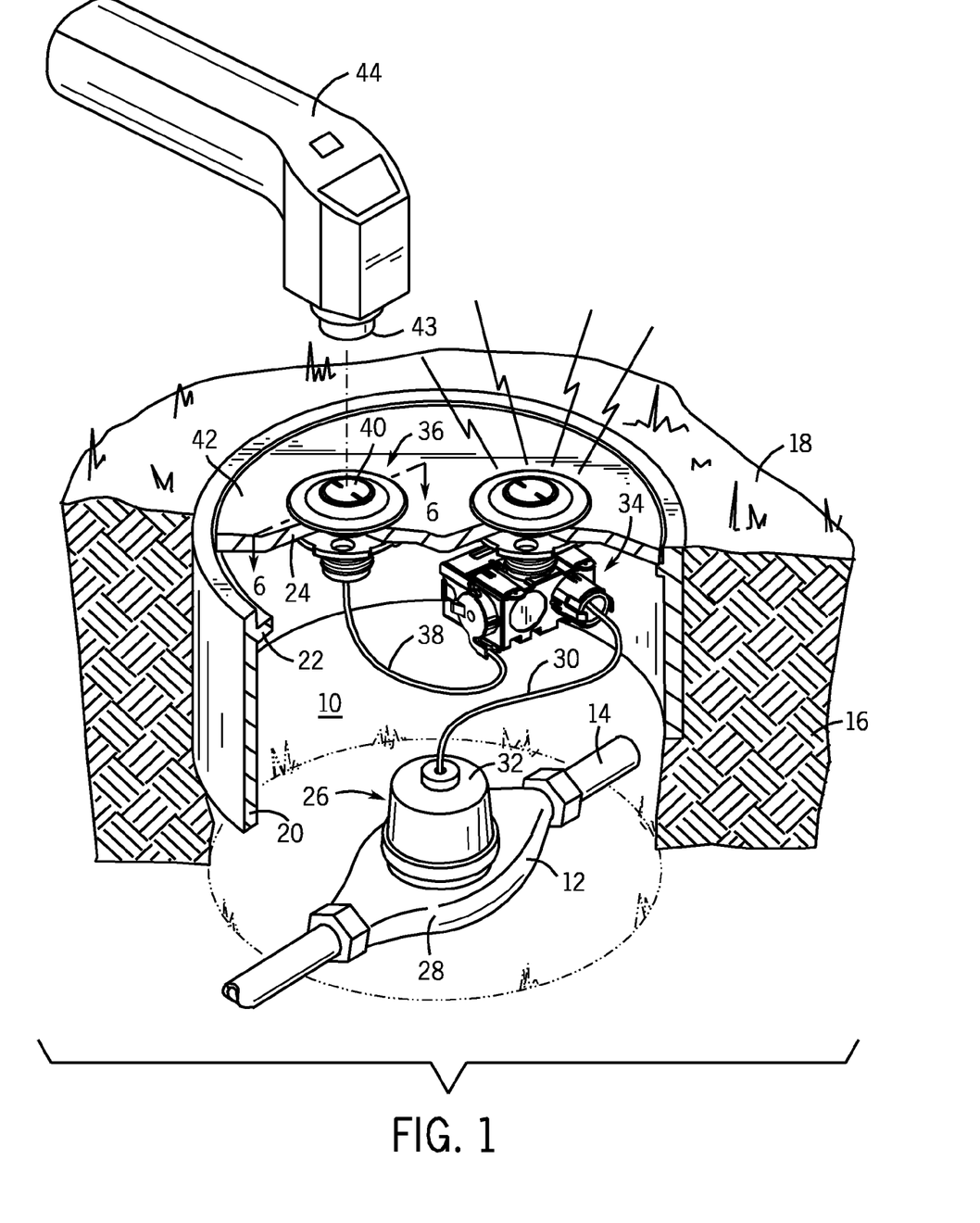
FIG. 1 is a partial sectional, perspective view of a utility meter including an electronic meter register coupled to a communication device and a reading module coupled to the communication device.

Referring first to FIG. 1, thereshow is a meter pit 10 that includes a utility meter 12. In the embodiment of the invention illustrated, the utility meter 12 is a water meter that is positioned in a water supply line 14 buried within the ground 16 and extending through the meter pit 10. Although the utility meter 12 will be described throughout the following description as being a water meter, it should be understood that the utility meter could be any of a variety of different types of meters for measuring different types of consumable commodities, such as gas, water, electricity or any other type of commodity.

As illustrated in FIG. 1, the meter pit 10 extends below the ground surface 18 and is defined by a pit box 20. The pit box 20 is a cylindrical, metal enclosure that is submerged in the ground 16. The pit box 20 includes an upper ledge 22 that supports a pit lid 24. In the embodiment of the invention illustrated, the pit lit 24 is preferably formed from a metallic material, such as cast iron. The pit lid 24 encloses the meter pit 10.

The utility meter 12 includes a meter register 26 that is mounted to the meter body 28. Preferably, the meter register 26 is an electronic meter register that includes internal circuitry that monitors the rotational movement of components contained within the meter body 28. The electronic meter register 26 is a common commercial component that detects the rotational movement of components within the meter body 28 and generates an electronic count of the volume of commodity that flows through the meter 12. The electronic meter register 26 records the volumetric flow information received from the meter body 28 in a conventional manner. An example of an electronic meter register is the Sensus ICE meter register. Alternatively, the meter register 26 can be a device that simply generates electronic pulses based on the volume of the commodity flow. In such an embodiment, the communication device 34 would include components to accumulate and store flow information.

As illustrated in FIG. 1, the electronic meter register 26 includes a data transfer wire 30 that extends through the top wall 32 of the meter register 26. The first end of the data transfer wire 30 is conductively connected to the internal circuitry of the electronic meter register 26. The electronic meter register 26, including the data transfer wire 30, are conventional components and are currently in use in automatic meter reading units, such as the Sensus RadioRead® meter transceiver unit (MXU). In the prior art systems, such as the Sensus RadioRead® MXU, the second end of the data transfer wire 30 is conductively connected to an external communication device through the use of physical wire connections that are secured using gel caps. As discussed previously, this type of physical interconnection between the data transfer wire 30 and a communication device 34 requires the use of gel caps and manual interconnection to the MXU.

As illustrated in FIG. 1, the system of the present invention further includes a reading module 36 coupled to the communication device 34 by a communication wire 38. The reading module 36 includes an upper contact surface 40 positioned above the top surface 42 of the pit lid 24. The contact surface 40 is thus accessible by a probe 43 of an interrogation device 44. The interrogation device 44 is a hand-held unit, such as the AutoGun™ available from Sensus Metering, which allows accumulated data from the meter 12 to be read locally. As can be understood in FIG. 1, the contact surface 40 of the reading module 36 extends above the pit lid 24 such that the contact surface 40 can be accessed without removing the pit lid 24. Further, programming information can be transmitted from the interrogation device 44 to the communication device 34 through the interconnection between the reading module 36 and the communication device 34.

Figure 2:
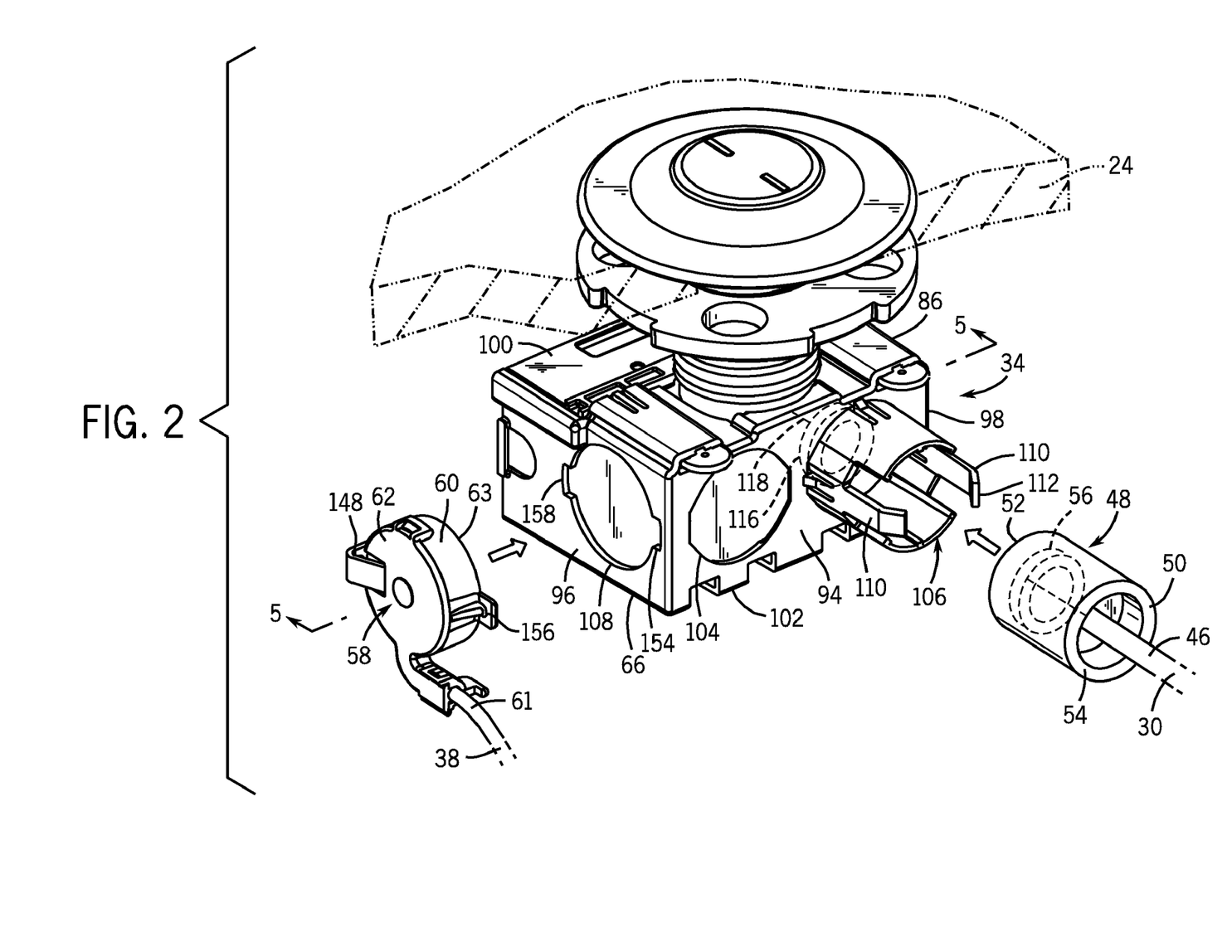
FIG. 2 is a perspective view illustrating the coupling between the communication device and the connector module of the communication wire.

Referring now to FIG. 2, thereshown is the second end 46 of the data transfer wire 30. The second end 46 includes an attachment module 48. The attachment module 48 preferably includes a cylindrical outer wall 50 formed from a molded plastic material. The outer wall 50 is integrally molded with and extends from a front face surface 52 to a back surface 54. The second end 46 of the data transfer wire 30 extends into the open interior defined by the outer wall 50 and is connected to a first inductive coil 56. The inductive coil 56 is centered within the cylindrical open interior defined by the outer wall 50 and is spaced inwardly from the front face surface 52. The inductive coil 56 is electrically connected to the second end 46 of the data transfer wire 30 such that an output data signal generated by the electronic meter register can be present at the inductive coil 56.

The attachment module 48 includes a sealing or potting material that surrounds the inductive coil 56 to prevent water from contacting the inductive coil 56. The data transfer wire 30 includes an outer, waterproof sheath that prevents water from contacting the electric wires contained within the data transfer wire 30.

Figure 4:
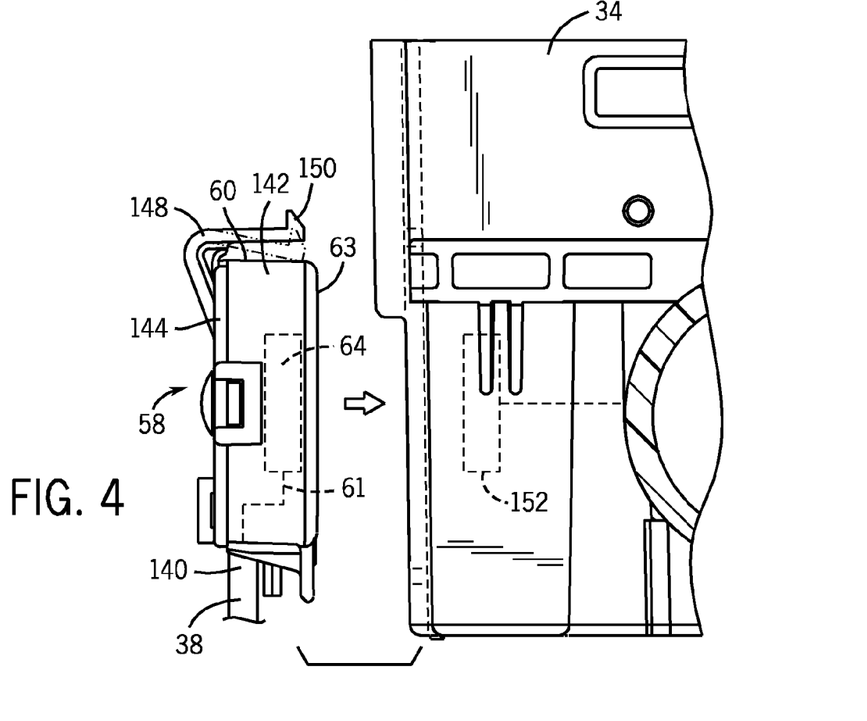
FIG. 4 is a top view taken along line 4—4 of FIG. 3 showing the removable connection of the connector module to the communication device.

In addition to receiving the attachment module 48, the communication device 34 also receives a connector module 58 formed on the second end 61 of the communication wire 38. The connector module 58 includes a generally cylindrical wall 60 extending between a back face surface 62 and a circular front surface 63. The entire connector module 58 is preferably formed from a molded plastic material that surrounds a transfer coil 64 connected to the second end 61 of the communication wire 38, as best shown in FIG. 4. The conductive transfer coil 64 is preferably centered within the connector module 58 and is connected to the communication wire 38 by the second end 61.

Referring back to FIG. 2, thereshown is the communication device 34 of the present invention. The communication device 34 includes internal circuitry, as will be described in greater detail below, which receives accumulated data from the electronic meter register 26 that relates to the volume of the commodity flowing through the meter. The internal circuitry extracts and stores the relevant consumption data and broadcasts a signal by radio frequency for reception and reading at a remote location. The communication device 34 is supported beneath the pit lid 24 and electronically coupled to the electronic meter register through the data transfer wire 30. The communication device 34 includes a main enclosure body 66 suspended beneath the pit lid 24.

Figure 3:
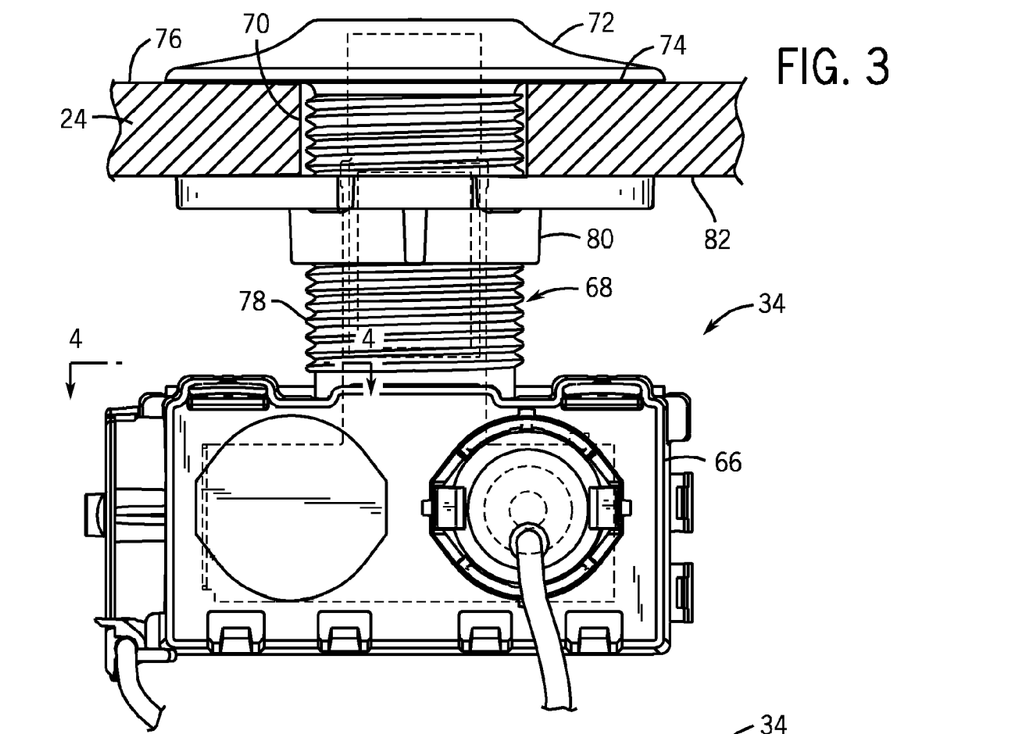
FIG. 3 is a front view illustrating the connector module of the communication wire secured to the communication device.

Referring now to FIG. 3, the communication device 34 includes an upper housing 68 that extends through an opening 70 formed in the pit lid 24. Specifically, the upper housing 68 includes a mushroom shaped top cap 72 having an outer diameter greater than the diameter of the opening 70. A bottom surface 74 of the top cap 72 contacts the top surface 76 of the pit lid 24. The upper housing 68 includes an externally threaded body 78 that extends through the opening 70 and is securely attached to the main enclosure body 66. A locking nut 80 is threadedly received along the body 78 and is tightened into contact with the bottom surface 82 of the pit lid 24. The threaded movement of the locking nut 80 into contact with the bottom surface 82 prevents the upper housing 68 from being removed from the opening 70.

Figure 5:
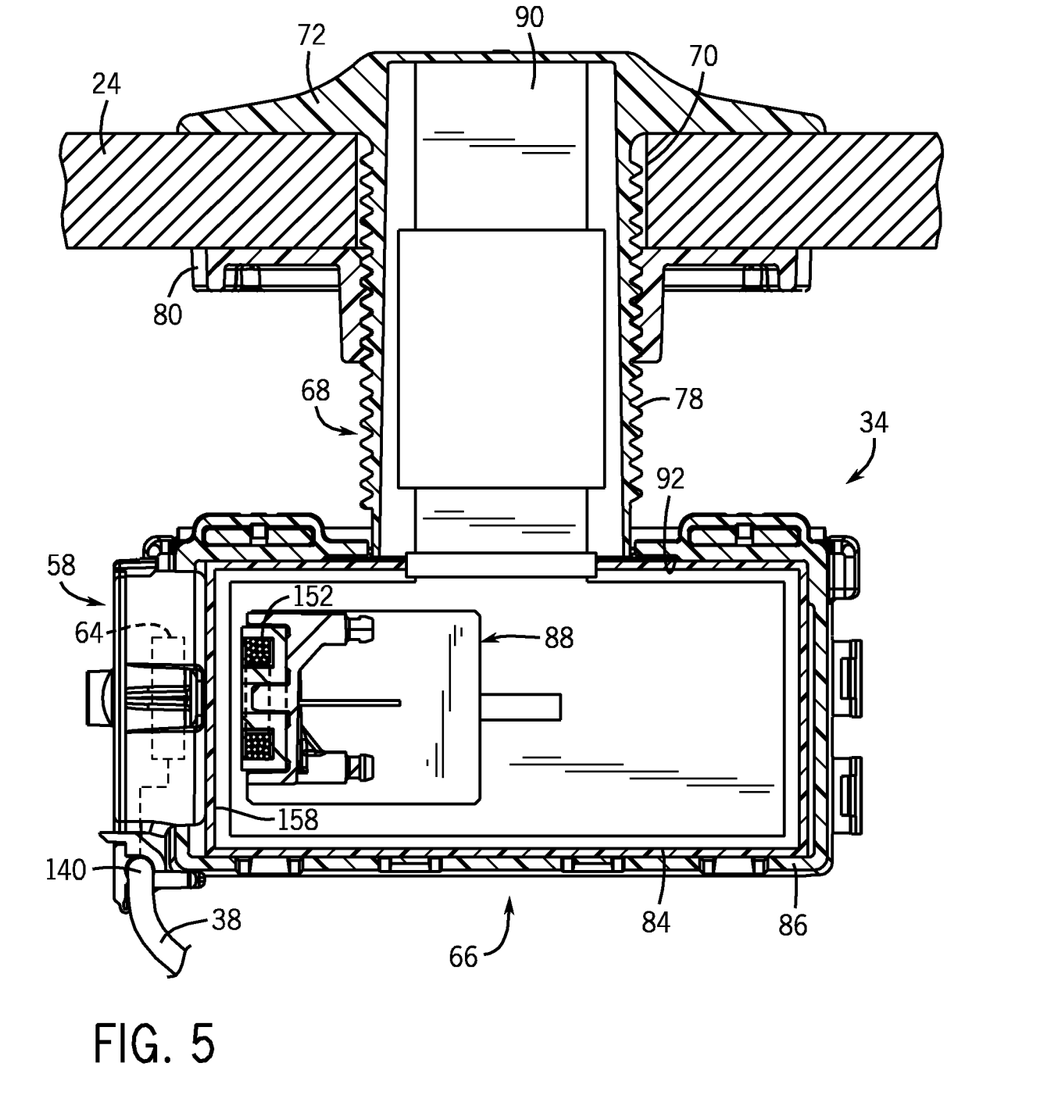
FIG. 5 is a section view taken along line 5—5 of FIG. 2.

Referring now to FIG. 5, the main enclosure body 66 generally includes a sealed inner enclosure 84 that is surrounded by an outer shell or boot 86. The inner enclosure 84 is a general rectangular member that completely encloses the electronic circuitry 88 of the communication device 34. The inner enclosure 84 includes an opening that allows an antenna 90 to be connected to the electronic circuitry 88. The antenna 90 is encapsulated in a protective block that rests on the top wall 92 of the inner enclosure 84.

Referring back to FIG. 2, the outer shell 86 includes a front face surface 94, a pair of side surfaces 96, 98, a top surface 100, a bottom surface 102 and an open back. The front face surface 94 of the outer shell 86 includes a pair of receptacle attachment openings 104. In the embodiment shown in FIG. 2, one of the attachment openings 104 is shown including a receptacle port 106 securely mounted in front of the attachment opening 104. The receptacle port 106 can be selectively removed from the front face surface 94 and attached to the other attachment opening 104. The shell 86 further includes a side opening 108 that is aligned with a programming coil of the communication device, as will be described below.

As best illustrated in FIG. 2, the receptacle port 106 is defined by a cylindrical outer wall defining a cylindrical open interior. The open interior of the receptacle port 106 is sized slightly larger than the outer surface of the attachment module 48. The receptacle port 106 includes a pair of opposed flexible fingers 110 each having an inwardly extending outer end 112. Each of the flexible fingers 110 can flex outwardly such that the outer ends 112 are separated by a distance greater than the outer diameter of the attachment module 48. Once the attachment module 48 is received within the receptacle port 106, the flexible fingers 110 return to their normal position such that the outer ends 112 engage the back surface 54 of the connector module 48. The interaction between the flexible fingers 110 and the back surface of the attachment module 48 retains the attachment module 48 within the receptacle port 106.

Although not shown, a second receptacle port can be positioned adjacent to the receptacle port 106 as shown. Thus, the communication device 34 can be configured to receive more than one attachment module 48, and thus coupled to more than one data transfer wire 30.

The electronic circuitry contained within the communication device 34 includes a receptacle coil 116. The receptacle coil 116 is connected by a wire 118 to the electronic circuitry. As illustrated in FIG. 2, the receptacle coil 116 is aligned with the first inductive coil 56 when the attachment module 48 is received in the receptacle port 106. The receptacle coil 116 and the first inductive coil 56 are aligned such that a signal present at the inductive coil 56 is transferred to the receptacle coil 116 by inductive coupling. Likewise, a signal present at the receptacle coil 116 can be transferred to the inductive coil 56. Thus, a signal can be transmitted from the inductive coil 56 through the front face surface of the attachment module 48, through the wall of the inner enclosure and received by the receptacle coil 116. In this manner, a signal present on the data transfer wire 30 can be transferred to the electronic circuitry without a conductive connection between the data transfer wire 30 and the electronic circuitry. Alternatively, the inductive coupling between the data transfer wire 30 and the communication device could be replaced by a standard conductive connection.

Figure 6:
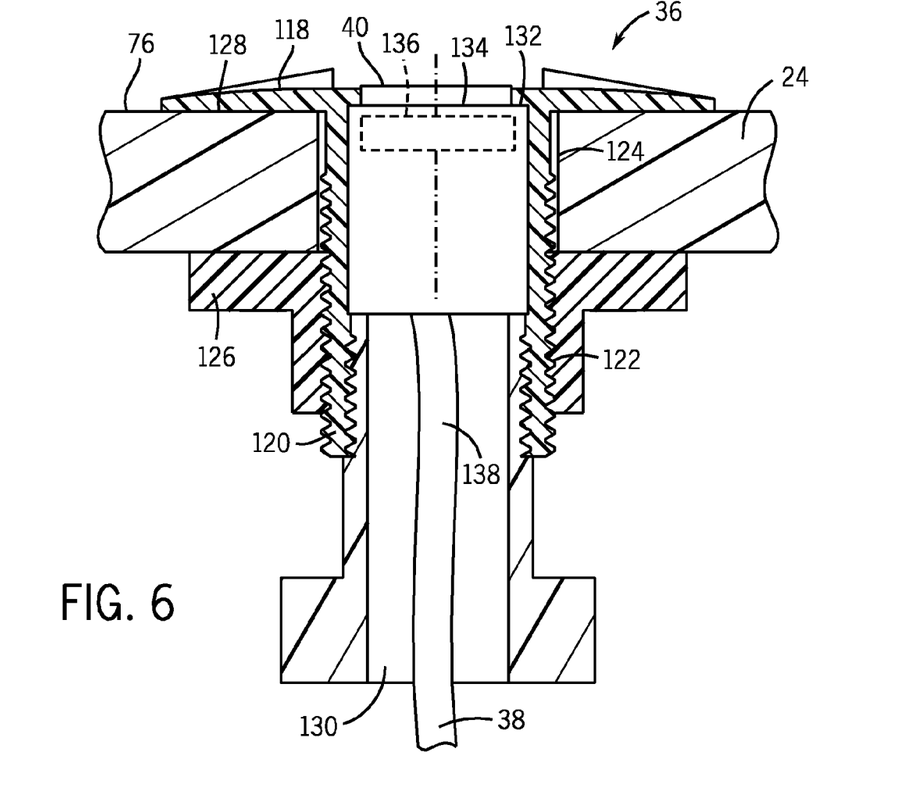
FIG. 6 is a section view taken along line 6—6 of FIG. 1 showing the mounting of the reading module to the pit lid.

Referring now to FIG. 6, thereshown is a detailed view of the reading module 36 of the present invention. The reading module 36 includes a main housing 118 that includes the upper contact surface 40 and a downwardly extending tubular extension 120. The tubular extension 120 has an exterior threaded section 122 that projects through an opening 124 in the pit lid 24. A locking nut 126 is threaded onto the threaded section 122 so as to clamp a portion of the pit lid 24 between the radially outward sections 128 of the housing 118 and the locking nut 126. A passage 130 extends axially through the housing 118 and an annular shoulder 132 is formed around the upper end of the passage 130. A transmission module 134 is received within the passage 130. The transmission module 134 includes a reading coil 136 connected to the communication wire 38. The reading coil 136 is positioned just beneath the contact surface 40 and generally in line with the top surface 76 of the pit lid 24. As can be understood in FIG. 1, when the probe 43 of the interrogation device 44 is brought near the contact surface 40, signals can be inductively transferred between the receiving coil 136 and a similar inductive coil contained within the probe 43. As can be understood in FIG. 6, the first end 138 of the communication wire 38 is electrically connected to the reading coil 136 such that signals from the communication wire 38 are present at the reading coil 136.

Referring now to FIGS. 4 and 5, the second end 140 of the communication wire 38 is received within the connector module 58. The connector module 58 includes a main body portion 142 and a cover member 144. The main body portion 142 includes a generally flat front surface 63 and a generally cylindrical outer wall 60. The cover 144 includes at least one engagement arm 148 having a locking finger 150. As illustrated in FIG. 4, the engaging arm 148 is deformable toward and away from the cylindrical wall 60 such that the engagement arm 148 can be selectively received within the outer shell 86, as best illustrated in FIG. 5.

As illustrated in FIG. 5, when the connector module 58 is received by the communication device 34, the transfer coil 64 is generally aligned with a programming coil 152 contained within the communication device 34 and separated from the programming coil by an air gap. The programming coil 152 is connected to the electronic circuitry 88, as best illustrated in FIG. 5. Although the programming coil 152 is shown in FIG. 5 as being a wound coil, it is contemplated that the programming coil 152 could also be a trace formed on a circuit board.

Referring back to FIG. 2, the connector module 58 is selectively received within a programming port defined by the side opening 108. The programming port includes a side notch 154 that receives leg 156 of the connector module 58. A second side notch 158 receives the engagement arm 148 such that the connector module 58 can be secured to the communication device 34. In the preferred embodiment of the invention, the engagement arm 148 creates a snap fit connection between the connector module 58 and the communication device 34. This snap fit connection can be completed in the field, thereby reducing the amount of time and effort required to connect the communication wire 38 of the reading module to the communication device 34.

Figure 7:
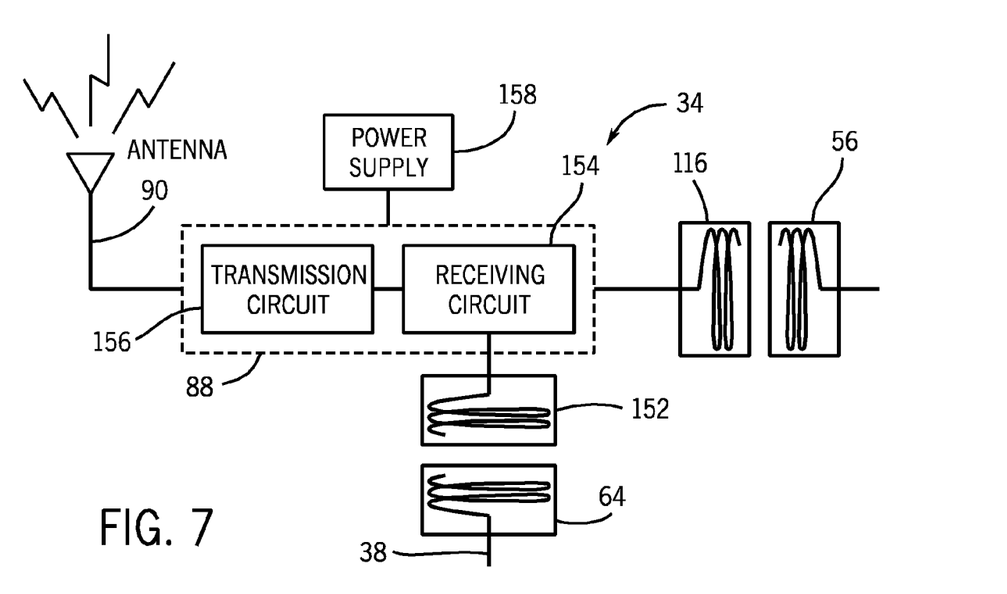
FIG. 7 is a schematic illustration of the electronic circuitry contained within the communication device of the present invention.

Referring now to FIG. 7, thereshow is a schematic illustration of the internal circuitry for the communication device 34. As illustrated, the communication device 34 includes electronic circuitry 88 that includes a receiving circuit 154 that receives a digital data signal from the receptacle coil 116 and the programming coil 152. A transmission circuit 156 creates and transmits a RF signal including the relevant consumption data from the meter register. The electronic circuitry 88 is a conventional circuit currently in use, such as in the Sensus RadioRead® meter transceiver unit (MXU). As illustrated, the electronic circuitry 88 is powered by a power supply 158. The power supply 158 supplies the required power for the transmission circuit 156 to generate an RF signal from the antenna 90 that can be received at a remote monitoring location. In addition to supplying the power to operate the transmission circuit 156, the power supply 158 provides electric power to the meter register through the inductive coupling between the receptacle coil 116 and the inductive coil 56 contained within the attachment module. The power supplied through the inductive coupling to the electronic meter register allows the electronic meter register to generate the output data signal back to the communication device 34 through inductive coupling between the first inductive coil 56 and second inductive coil 116.

Receiving circuit 154 is also coupled to the programming coil 152 to receive and transmit information from the communication device 34. The programming coil 152 is inductively coupled to the transfer coil 64 such that signals present at either of the coils can be transferred to the other coil. The receiving circuit 154 of the electronic circuitry 88 is able to both receive information from the reading module connected to the transfer coil 64 through the communication wire 38 as well as deliver the accumulated data from the meter to the reading module.

Referring back to FIG. 1, the operation of the system for transmitting consumption measurement data from the utility meter to either a remote monitoring location or to a local interrogating device 44 will now be discussed. Initially, the meter body 28 is installed within the meter pit 10 in line with the water supply pipe 14. Once the utility meter 12 is in place, the electronic meter register 26 is installed onto the meter body 28. As described previously, the meter register 26 is a conventional component that converts mechanical movement within the meter body 28 into an electronic measurement that is stored within the electronic meter register 26. Alternatively, the meter register 26 can be integrated with the meter body 28.

As illustrated in FIG. 1, the electronic meter register 26 includes the data transfer wire 30 that extends through the top wall 32 of the meter register 26. The data transfer wire 30 is attached at its first end to the electronic components contained within the electronic meter register 26. As illustrated in FIG. 2, the second end of the data transfer wire includes the cylindrical attachment module 48 that surrounds the inductive coil 56. When required, the electronic meter register 26 can generate an output data signal that includes the commodity consumption data to the inductive coil 56.

As described previously, the communication device 34 is attached to the pit lid 24 by the interaction between the top cap 72 of the upper housing 68 and the locking nut 80. As best shown in FIG. 5, the sealed inner enclosure 84, which includes the electronic circuitry 88 for the communication device 34, is received within the outer shell 86. The outer shell 86 engages the upper housing 68 to support the inner enclosure 84 in the position shown in FIG. 5.

As clearly illustrated in FIG. 5, the electronic circuitry 88 includes a programming coil 152 that is generally aligned with a programming port formed as part of the communication device. The programming coil 152 is positioned behind a side wall 158 of the inner enclosure 84 and is generally aligned with the transfer coil 64 when the connector module 58 is received within the programming port. In this manner, signals and data from the communication device 34 can be inductively transmitted from the programming coil 152 to the transfer coil 64. Likewise, programming information from the transfer coil 64 can be inductively transferred to the programming coil 152. The inductive coupling between the programming coil 152 and the transfer coil 64 allows electronic signals to be transferred bi-directionally between the communication device 34 and the reading module 36.

As can be understood in FIG. 1, when the interrogating device 44 is brought into close proximity with the reading module 36, a signal from the probe 43 contained as part of the interrogating device 44 can be received by the reading coil 136 (FIG. 6) of the reading module 36. The signal received by the reading coil 136 is transferred by the communication wire 38 to the transfer coil 64 in electrical communication with the second end of the communication wire 38. If an interrogation signal received from the interrogating device requests the accumulated data from the utility meter 28, the electronic circuitry of the communication device acquires the data from the meter register and the accumulation data is sent to the reading module 36 through the first inductive coupling between the programming coil 152 and the transfer coil 64. A second inductive coupling between the reading coil 136 and the coil within the probe 43 allows the data to be received by the interrogation device 44. Thus, a utility worker sent to physically acquire meter data from the meter 28 can acquire data from the reading module 36 without removing the pit lid 24.

Although the embodiment of the invention is shown in the Figures as including the reading module 36, the system can be utilized without requiring the reading module 36. In a system that does not include the reading module 36, the interrogating device 44 can be brought into close proximity with the programming port formed as part of the communication device. When the interrogating device 44 is in closed proximity to the programming port, a signal from the probe 43 contained as part of the interrogating device can be received by the programming coil 152 of the communication device. If the interrogation signal received from the interrogating device requests the accumulated date from the utility meter 28, the electronic circuitry of the communication device acquires the data from the meter register and accumulation data is sent directly to the interrogating device 44 through an inductive coupling between the programming coil 152 and the coil within the probe 43. In addition to the transfer of accumulated data, the inductive coupling between the programming coil and the interrogating device also allows programming information to be directly transferred from the interrogating device to the communication device. The inductive coupling between the programming coil 152 and the interrogating device allows electronic signals to be transferred bi-directionally between the communication device 34 and the interrogating device 44.

As can be understood by the above description of the present embodiment of the invention, the interconnection between the electronic meter register and the communication device is created by an inductive coupling between the two devices. Specifically, an attachment module on the data transfer wire of the electronic meter register is inductively coupled across the enclosure of the communication device such that the physical wiring connections can be replaced. In addition, an interconnection connection between the reading module and the communication device is also created by an inductive coupling between the two devices. Specifically, a connector module on the communication wire of the reading module is inductively coupled across the enclosure of the communication device such that physical conductive wiring connections can be replaced. Eliminating the physical wire connections dramatically decreases the amount of time required to create the electrical connection while at the same time reducing the complexity of such connection.

What is claimed is:

1. A system for obtaining and transmitting consumption measurement data from a utility meter, the utility meter being operable to generate data signals related to the flow of a commodity through the utility meter, the system comprising:
   a communication device coupled to the utility meter for receiving the data signals from the utility meter, for processing the data signal to determine accumulated data, and for wirelessly transmitting accumulated data to a remote monitoring location via an antenna, the communication device including a programming coil generally aligned with a programming port; and
   a reading module inductively coupled to the programming coil of the communication device, via a connector module, for receiving the accumulated data from the communication device, the reading module including a reading coil positioned beneath the top surface of the reading module such that the accumulated data is read by an interrogating device via the reading coil, the reading coil coupled to a first end of a communication wire and a transfer coil contained within the connector module coupled to a second end of the communication wire, wherein the transfer coil of the communication wire is electrically spaced from the programming coil of the communication device when the connector module is aligned with the programming port of the communication device.

2. The system of claim 1 wherein the reading module is located remotely from the communication device.

3. The system of claim 2 wherein both the communication device and the reading module are mounted to a pit lid of a pit enclosing the utility meter and the meter register.

4. The system of claim 1 further comprising a data transfer wire coupled at a first end to the utility meter for receiving the data signals, a second end of the data transfer wire including an inductive coil enclosed within an attachment module,
   wherein the communication device includes a receptacle port sized to receive the attachment module of the data transfer wire, the receptacle port being generally aligned with a receptacle coil contained within the communication device, wherein the inductive coil of the attachment module of the data transfer wire is electrically spaced from the receptacle coil of the communication device when the attachment module is received within the receptacle port.

5. The system of claim 4 wherein the first end of the data transfer wire is electrically connected to the utility meter.

6. The system of claim 4 wherein the inductive coil of the data transfer wire is inductively coupled to the receptacle coil of the communication device such that the accumulated data can be inductively transferred from the utility meter to the communication device.

7. The system of claim 1 wherein the interrogating device is inductively coupled to the reading coil of the reading module to obtain the accumulated data from the communication device and to transfer programming information to the communication device.

8. A system for obtaining and transmitting consumption measurement data from a utility meter positioned within a subsurface pit enclosure including a pit lid, the utility meter having an electronic meter register for accumulating data related to the flow of a commodity through the meter, the system comprising:
   a communication device coupled to the electronic meter register for receiving the accumulated data and wirelessly transmitting the accumulated data to a remote monitoring location via an antenna, the communication device including a programming coil generally aligned with a programming port; and
   a reading module inductively coupled to the programming port of the communication device, via a connector module, for receiving the accumulated data from the communication device, and including a reading coil positioned beneath the top surface of the reading module such that the accumulated data is read by an interrogating device at the reading coil, the reading coil coupled to a first end of a communication wire and a transfer coil contained within the connector module coupled to a second end of the communication wire, wherein the transfer coil of the data transfer wire is electrically spaced from the programming coil of the communication device when the connector module is aligned with the programming port of the communication device.

9. The system of claim 8 wherein the reading module includes a contact surface that is accessible through the pit lid such that the accumulated data can be read by the interrogating device without removing the pit lid from the pit enclosure.

10. The system of claim 8 wherein the reading module is positioned remotely from the communication device.

11. The system of claim 8 wherein the interrogating device is inductively coupled to the reading coil to obtain the accumulated data from the communication device and to transfer programming information to the communication device.

12. The system of claim 8 further comprising:
   a data transfer wire coupled at a first end to the electronic meter register for receiving the accumulation data, a second end of the data transfer wire including an inductive coil enclosed within an attachment module,
   wherein the communication device mounted to the pit lid includes at least one receptacle port sized to receive the attachment module of the data transfer wire, the receptacle port being generally aligned with a receptacle coil contained within the communication device, wherein the inductive coil of the data transfer wire is electrically spaced from the receptacle coil of the data transfer wire when the attachment module of the data transfer wire is received within the receptacle port.

13. A system for obtaining and transmitting consumption measurement data from a utility meter, the utility meter having an electronic meter register operable to accumulate data relating to the flow of a commodity through the utility meter, the accumulated data being represented by an output data signal, the system comprising:

a data transfer wire conductively connected at a first end to the electronic meter register for receiving the output data signal, a second end of the data transfer wire including an inductive coil enclosed within an attachment module;

a communication device inductively coupled to the data transfer wire for receiving the output data signal and transmitting the accumulated data to a remote monitoring location via an antenna, wherein the communication device includes a receptacle coil, wherein the inductive coil of the attachment module is electrically spaced from the receptacle coil when the attachment module is received by the communication device, the communication device further including a programming coil generally aligned with a programming port; and a reading module inductively coupled to the programming coil of the communication device, via a connector module, for receiving the accumulated data from the communication device; and including a reading coil positioned beneath the top surface of the reading module such that the accumulated data is read by an interrogating device at the reading coil, the reading coil coupled to a first end of a communication wire and a transfer coil contained within the connector module coupled to a second end of the communication wire, wherein the transfer coil of the communication coil is electrically spaced from the programming coil of the communication device when the connector module is aligned with the programming port of the communication device.

14. The system of claim 13 wherein the reading module is located remotely from the communication device.

15. The system of claim 14 wherein both the communication device and the reading module are mounted to a pit lid of a pit enclosing the utility meter and the electronic meter register.

* * * * *